(12) United States Patent
Raman

(10) Patent No.: US 10,167,089 B2
(45) Date of Patent: Jan. 1, 2019

(54) GATEWAY FOR AIRCRAFT SENSOR DATA

(71) Applicant: AT&T Mobility II LLC, Atlanta, GA (US)

(72) Inventor: Kaveri Raman, Matawan, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/949,287

(22) Filed: Nov. 23, 2015

(65) Prior Publication Data
US 2017/0144773 A1    May 25, 2017

(51) Int. Cl.
| | |
|---|---|
| B64D 45/00 | (2006.01) |
| B64D 11/06 | (2006.01) |
| H04L 29/08 | (2006.01) |
| H04W 4/70 | (2018.01) |

(52) U.S. Cl.
CPC ............ *B64D 45/00* (2013.01); *B64D 11/06* (2013.01); *B64D 2045/0085* (2013.01); *H04L 67/12* (2013.01); *H04W 4/70* (2018.02)

(58) Field of Classification Search
CPC ........ G08B 13/19684; G08B 13/19697; H04B 7/18504; H04B 7/18506; G05D 1/0055; B64D 2045/0045; B64D 45/0015
See application file for complete search history.

(56) References Cited

U.S. PATENT DOCUMENTS

| | | | |
|---|---|---|---|
| 6,929,218 B1* | 8/2005 | Sanford | B64D 11/0015 244/118.5 |
| 8,589,994 B2 | 11/2013 | Monroe | |
| 2002/0160773 A1 | 10/2002 | Gresham et al. | |
| 2003/0065428 A1 | 4/2003 | Mendelson et al. | |
| 2006/0163430 A1* | 7/2006 | Cordina | B64D 45/0015 244/118.5 |
| 2009/0132128 A1* | 5/2009 | Marriott | B60R 22/48 701/45 |
| 2010/0324774 A1* | 12/2010 | Bouni | B60R 21/0152 701/31.4 |
| 2011/0295466 A1* | 12/2011 | Ostu | B60N 2/002 701/45 |
| 2014/0036686 A1 | 2/2014 | Bommer et al. | |

(Continued)

FOREIGN PATENT DOCUMENTS

CN    103836767    6/2014

OTHER PUBLICATIONS

Skift, Marisa Garcia, "Health App Might One Day Tell Flight Crew When You're Blue or Green". Apr. 26, 2015. pp. 1-7.

(Continued)

*Primary Examiner* — Mirza Alam

(57) ABSTRACT

An example device includes a processor and a computer-readable medium storing instructions which, when executed by the processor, cause the processor to perform operations for processing non-flight performance related sensor data from a sensor of an aircraft. The operations may include receiving non-flight performance related sensor data from a sensor of an aircraft, determining a condition based upon the non-flight performance related sensor data, selecting a recommended action based upon the condition that is determined based upon the non-flight performance related sensor data, and sending the recommended action to a device of a flight crew member of the aircraft.

20 Claims, 3 Drawing Sheets

(56) References Cited

U.S. PATENT DOCUMENTS

| 2014/0125355 A1* | 5/2014 | Grant | B64D 11/06 |
| | | | 324/629 |
| 2015/0189007 A1 | 7/2015 | Zhang | |
| 2015/0279218 A1 | 10/2015 | Irrgang et al. | |
| 2015/0296404 A1 | 10/2015 | Sharma et al. | |

OTHER PUBLICATIONS

"Internet of Things: Wireless Sensor Networks". Jul. 31, 2014. pp. 1-78.

* cited by examiner

GATEWAY FOR AIRCRAFT SENSOR DATA

Embodiments of the present disclosure relate to aircraft sensors, and more specifically to a gateway for aggregating aircraft sensor data from diverse sensor types and for securely transmitting the aircraft sensor data via a wireless network, e.g., a cellular network, for storage in a cloud-based storage system.

BACKGROUND

Certain flight-related parameters of an aircraft may be recorded by a flight data recorder (FDR). In addition, audio data from a cockpit may be recorded by a cockpit voice recorder (CVR). These components may be integrated into a single unit, which may be referred to as an electronic flight data recorder (EFDR). The CVR may record two hours or more of audio data while the FDR may record up to 20 hours or more of other data. The data stored by the FDR may include recordings from a flight data acquisition unit (FDAU) or other components, such as recordings of: airspeed, altitude, vertical acceleration, pitch, and fuel level. Some data may be forwarded from the aircraft to the ground using a point-to-point system. For instance, the FDAU may forward data to an Aircraft Communications Addressing and Reporting System (ACARS) for transmittal to AGARS equipment on the ground via satellite or dedicated ground based radios.

SUMMARY

In one embodiment, the present disclosure provides a device, computer-readable medium, and method for processing non-flight performance related sensor data from a sensor of an aircraft. For example, a device includes a processor and a computer-readable medium storing instructions which, when executed by the processor, cause the processor to perform operations. In one example, the operations include receiving non-flight performance related sensor data from a sensor of an aircraft, determining a condition based upon the non-flight performance related sensor data, selecting a recommended action based upon the condition that is determined based upon the non-flight performance related sensor data, and sending the recommended action to a device of a flight crew member of the aircraft.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

Figure 1:
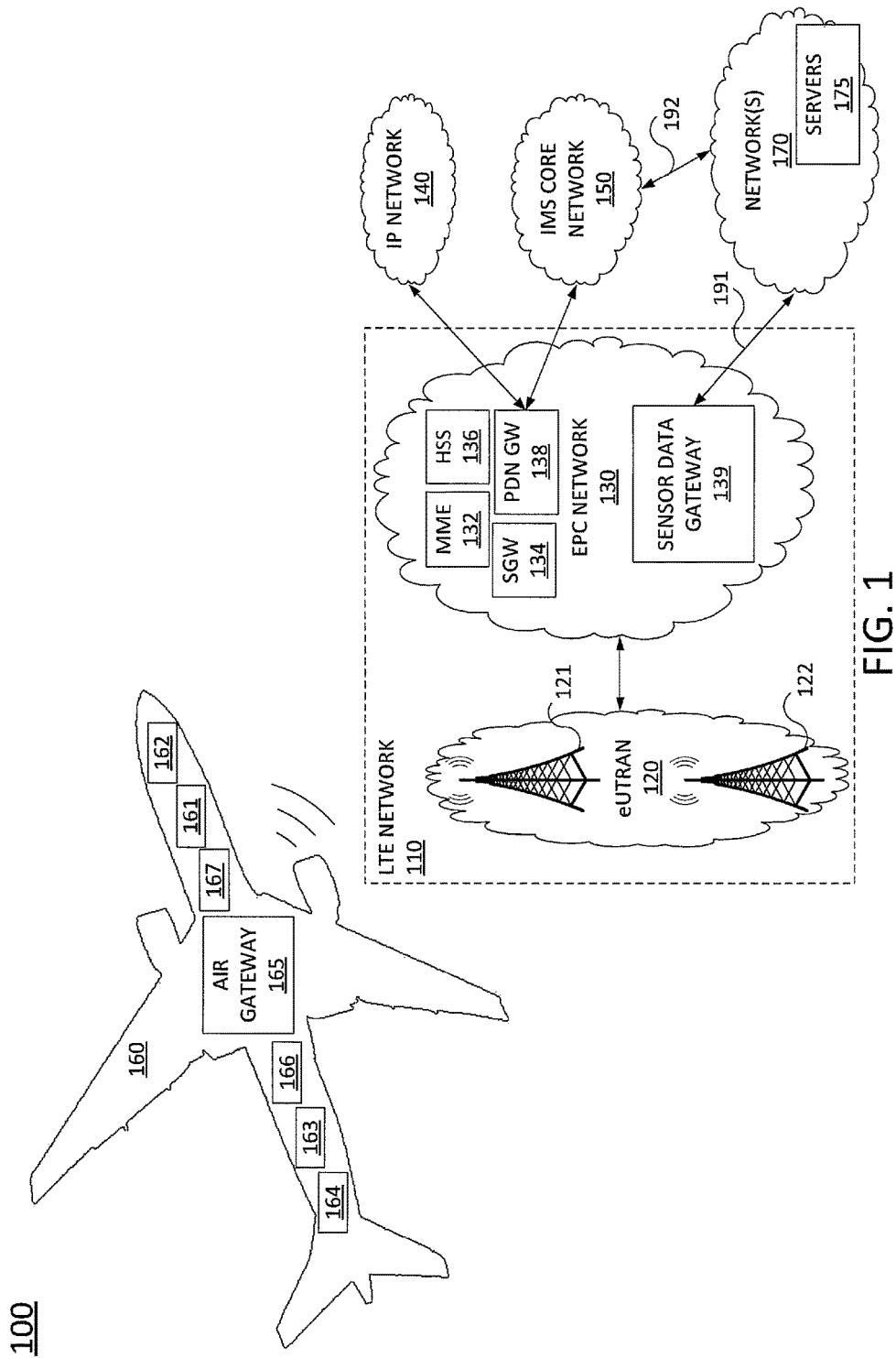
FIG. 1 illustrates an example network related to the present disclosure.

The present disclosure relates to devices and systems that may include a network element, referred to herein as an air gateway, to integrate sensor data on an airplane or other aircraft and forward the sensor data to a ground-based device. In one example, the air gateway integrates diverse types of sensor data (and other device data) on an aircraft into one flow and forwards the sensor data to a wireless network, e.g., a cellular network. In one example, the sensor data may reach a core network, e.g., an Evolved Packet Core (EPC), and the sensor data may be passed to a ground-based device using either multi-protocol label switching (MPLS), virtual private network (VPN), VPN over MPLS, or other secure transport. The ground-based device may comprise a component of a "big data lake," e.g., a cloud/network-based data repository for flight management, airline management, air traffic control (ATC), and so forth. Within the ground-based device, or via any device accessing the sensor data from the aircraft on the ground-based device, the sensor data can be analyzed for generating and providing observations, instructions, or recommendations to ATC, airline operations, and so forth.

In one example, there may be multiple integration layers of air gateways as sensor data from multiple aircraft is collected and fed to the ground-based device for analysis. In another example, the air gateway, or a device connected to the air gateway on the aircraft, may receive sensor data from sensors on the aircraft and analyze the sensor data for purposes of reporting observations and providing instructions or recommendations to a flight crew. Any such device, whether aircraft-based or ground-based, for receiving sensor data from an aircraft sensor and providing observations, instructions, and/or recommendations based upon the sensor data may be referred to herein as an aircraft management server.

In one example, the sensor data may comprise non-flight performance related sensor data, e.g., sensor data that does not relate to altitude, airspeed, acceleration, heading, aircraft pitch, aircraft roll, flap selection, coordinates/location, fuel level, engine rotations per minute (RPMs), etc. In one example, non-flight performance related sensor data comprises data not collected by a flight data recorder. For example, non-flight performance related sensor data may include sensor readings from sensors to detect physical parameters such as: a temperature of a cabin, a cabin oxygen level, an open/closed state of a tray table, a recline angle of a passenger seat, or seat pitch, a used/unused state of a power port adjacent to a passenger seat, an open/closed state and/or a locked/unlocked state of: 1) a bathroom door, 2) a cockpit door, 3) a door to another restricted area of the aircraft, e.g., the baggage area or other portions of a lower level of the aircraft below a passenger cabin, an occupancy or vacancy of: 1) a passenger seat, 2) a pilot seat, 3) a co-pilot seat, 4) a navigation seat, 5) a jump seat, 6) a flight attendant seat, etc., a force/weight on a seat, e.g., to detect a weight of an occupant of the seat, seat belt closure status (e.g., whether seat belts are engaged or dis-engaged for seats in the aircraft) and so forth.

In various examples, non-flight performance related sensor data may be used to enhance aircraft management by flight crews and ground-based personnel. For instance, examples of the present disclosure may increase the ability of flight crew and ground-based personnel to manage various aspects of aircraft operations that do not relate to flight performance, such as for passenger comfort, for compliance with regulations, for detection of potential malicious activity, for detection of pilot or passenger emergencies, and so forth. Aircraft personnel have many duties and often are not able to monitor all aspects of an aircraft at the same time. For instance, during takeoff and landing procedures, flight crew may instruct passengers to return seats to full upright positions and to place tray tables in a closed and locked position. The flight crew may also pass through the passenger cabin to check that each passenger and passenger seat position is in compliance. However, some passengers may simply recline their seats after the flight crew has passed or returned to the flight attendant seating in preparation for landing and takeoff. Thus, examples of the present disclosure may provide recommended actions regarding various conditions that may be detected via sensor readings of sensors throughout an aircraft.

In accordance with the present disclosure, a flight crew member may include a pilot/captain, co-pilot, navigator, flight attendant, mechanic, or engineer aboard the aircraft. Although not necessarily part of the same organization as airline employees comprising flight crew members, for purposes of the present disclosure, a flight crew member may further include a sky marshal or air marshal, e.g., of Federal Air Marshal Service (FAMS), or a similar law enforcement officer assigned to the aircraft. In addition, as referred to herein, an aircraft may comprise: a single engine or multi-engine jet or turbo-prop airplane, a seaplane, a helicopter, a blimp or airship, and the like.

In any of the following scenarios, a determination by an aircraft management server of a certain condition may cause the aircraft management server to select an appropriate recommended action in response to the condition, and to send the recommended action to a device of a flight crew member of the aircraft. Where the aircraft management server comprises a ground-based device, the recommended action may be sent to an air gateway on the aircraft and relayed to one or more devices of one or more flight crew members. The devices of the flight crew members may comprise computing devices such as interactive display panels or computing consoles distributed throughout the aircraft, or may comprise personal mobile devices carried by the respective flight crew members.

To illustrate, in one example, sensor data relating to seat recline angles of various passenger seats on an aircraft may be aggregated by an aircraft management server and analyzed to verify compliance with takeoff and landing procedures that call for all passenger seats to be in an upright position. Similarly, sensor data relating to whether tray tables are open or closed may be collected by an aircraft management server to verify whether tray tables are all in a closed position in accordance with takeoff and landing procedures. If there is substantial non-compliance, the aircraft management server may record an exception, and the flight crew can be designated for additional training or simply reminded to enforce proper procedures. Alternatively, or in addition, a notification may be sent to a device of a flight crew member, or to devices of flight crew members identifying particular seat locations where the seat should be returned to an upright position or where a tray table should be closed.

In another example, a non-full flight may have seats assigned to passengers in order to have a proper weight distribution. By analyzing seat occupancy sensor data from the seats on the aircraft by an aircraft management server, the present method may determine that the passengers in the assigned seats are substantially compliant or not compliant with the weight-distribution plan. In still another example, seat occupancy sensor data may be used to identify a passenger may be away from an assigned seat for a measured period of time. For instance, a passenger who remains up from his or her seat for a long period of time may have a medical issue, such as back pain or knee pain that causes the passenger to remain up for a long period of time. However, a passenger who is up from the seat for a long period of time may also be engaged in a disruptive activity. Thus, a notification may be sent to a device of a flight crew member to check on this particular passenger to ensure safety of the aircraft or comfort of the identified passenger.

In a similar manner, data from a lavatory door sensor that is collected and analyzed by the aircraft management server may be used to determine when a bathroom door has remained locked for more than a threshold duration of time. A passenger's intent on malicious or disruptive activities aboard the aircraft may use the privacy of the bathroom in furtherance of such activities. Thus, an instruction to check on the lavatory when the lavatory door has been locked/occupied for more than a certain duration of time may be alerted to the flight crew. In addition, in one example, lavatory door data may be correlated with seat occupancy data to indicate which passengers may be occupying the bathroom. For instance, seat occupancy data may indicate that a particular passenger seat has been un-occupied for 20 minutes, while the lavatory door sensor data indicates that the bathroom door has been locked continuously for 19 minutes. In this case, the notification that the lavatory has been occupied for more than the threshold duration of time may also indicate a potential identity of a particular passenger or passengers who may be occupying the bathroom.

In one example, seat sensor data may also record a force on the seat, e.g., indicative of a weight of the occupant. Such data may be used on the ground to verify compliance with a weight distribution plan. However, such data may also be used to determine which passengers may have changed seats, and to which seats the passengers have switched. Although it may be difficult to confirm the identity of a specific seat occupant, it may be used for probabilistic determinations of which passengers may have switched seats. Such data may be indicative of various scenarios. For example, a family of four with two children may have been split up and assigned seats in different parts of the passenger cabin. However, polite passengers may have offered to switch seats to allow the family to be together. On the other hand, two malicious passengers may separately board a flight and select or have seats assigned separately to avoid any inferences that the malicious passengers are known to one another. The malicious passengers may later attempt to sit close to one another if the flight is not full. However, seat occupancy data and/or force data may reveal that one or both of these two passengers have likely moved to other seats.

For example, passenger weights may be recorded by seat sensors at the beginning of a flight, e.g., before takeoff. Thus, if a weight reading of a particular seat sensor indicates a change in weight, either to zero or to a different weight, it may indicate that the original occupant has left the seat and/or changed seats. In addition, a different seat sensor may record a changed weight reading that comprises the same weight as previously recorded for the passenger in the original seat at the start of the flight (or a weight that is sufficiently close to the previously recorded weight, e.g., within a three kilogram deviation). Thus, a new weight reading at a seat that corresponds to a weight of a passenger whose original seat sensor also recorded a change in weight may reveal that this particular passenger has moved to the seat. Where this observational information is determined in a ground-based aircraft management server, a notification and/or instruction to investigate may be relayed back to a flight crew on the aircraft, or may be further analyzed by additional ground-based personnel or devices. In addition, the alert or instruction may include additional information regarding the passenger, such as the name, age, a photograph, a nationality, additional members in a traveling party, connecting flight information, and so forth.

In still another example, seat sensor data regarding a pilot seat or co-pilot seat may be analyzed by the aircraft management server to reveal that one of these personnel has been up from the seat for greater that a threshold period of time, or has remained in the seat for greater than a threshold period of time. In one example, such data may be correlated with cockpit door sensor data for example, to determine that one of the pilots may have been locked out of the cockpit. Similarly, a seat sensor of a cockpit seat may record a force/weight on the seat. Where the force/weight reading diverges from a weight of a pilot assigned to the cockpit seat position, a notification may be provided to aircraft crew members. For instance, a notification may comprise an instruction to contact ground-based personnel to confirm whether or not a pilot emergency exists. The foregoing comprises just several examples of how non-flight performance related sensor data may be collected and analyzed to support various flight crew duties and to enhance aircraft management. These and other aspects of the present disclosure are discussed in greater detail below in connection with the example FIGS. 1-3.

To better understand the present disclosure, FIG. 1 illustrates an example network, or system 100 suitable for implementing embodiments of the present disclosure for processing non-flight performance related sensor data from a sensor of an aircraft. In one example, the system 100 comprises a Long Term Evolution (LTE) network 110, an IP network 140, and a core network, e.g., an IP Multimedia Subsystem (IMS) core network 150. In one example, system 100 is provided and operated by a wireless network operator, e.g., a cellular network operator. As shown in FIG. 1, the system 100 connects sensors 161-164 and endpoint devices 166-167 on an aircraft 160 with one or more aircraft management servers or device, e.g., air gateway 165 of the aircraft 160 and/or one or more server(s) 175 in network(s) 170. The endpoint devices 166-167 may each comprise a cellular telephone, a smartphone, a tablet computing device, a laptop computer, a pair of computing glasses, a wireless enabled wristwatch, or any other wireless and/or cellular-capable mobile telephony and computing device (broadly, "mobile endpoint devices"). Endpoint devices 166-167 may also comprise a computing console or interactive touch screen based device, e.g., with at least a display/monitor and a keyboard or other input device. For example, endpoint devices 166-167 may comprise touch screens deployed at respective locations within the aircraft 160 for use by flight crew members, e.g., in a galley area of the aircraft 160. It should be noted that for illustrative purposes four sensor 161-164 and two endpoint devices 166-167 are illustrated in the example of FIG. 1. However, in other, further, and different examples, any number of sensors and endpoint devices may be deployed in the system 100 or in a similar system in accordance with present disclosure.

As described in greater detail below, in one example, aircraft 160 comprises an air gateway 165, e.g., a server for aggregating non-flight performance related sensor data from various sensors on the aircraft 160. For instance, sensors 161-164 (e.g., temperature sensors, contact sensors, motion sensors, optical sensors, pressure sensors, air flow sensors, and the like) may measure and record non-flight performance related sensor data comprising readings of various physical parameters and communicate the sensor data via wireless or wired communication links with air gateway 165.

In various examples, wireless communications from any one or more of the sensors 161-164 with air gateway 165 may comprise Bluetooth or Bluetooth Low Energy (BLE) transmissions, Institute of Electrical and Electronics Engineers (IEEE) 802.11 communications, other standards-based or proprietary wireless communications, and so forth. In other examples, wired communications from any one or more of the sensors 161-164 with air gateway 165 may include Ethernet-based communications, such as transmission control protocol/internet protocol (TCP/IP) packets transmitted via Ethernet, or any other local area network (LAN)-based communication technique. In one example, the air gateway 165 may also be for determining conditions based upon the non-flight performance related sensor data, selecting recommended actions based upon the conditions that are determined, and for providing recommended actions to devices of flight crew members. In another example, the air gateway 165 may be for transmitting the non-flight performance related sensor data (as well as data from other devices, such as endpoint devices 166-167), to cellular network components and for receiving communications from the cellular network components for various devices on board the aircraft 160. For example, air gateway 165 may also communicate with endpoint devices 166-167 via Ethernet-based communications, such as transmission control protocol/internet protocol (TCP/IP) packets transmitted via Ethernet, or any other local area network (LAN)-based communication technique, or wirelessly via IEEE 802.11 based communications, Bluetooth, and so forth.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3$^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UE) may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), performs authentication and authorization of a wireless service user, and provides information about the subscriber's location. The EPC network 130 may also comprise a public data network (PDN) gateway 138 which serves as a gateway that provides access between the EPC network 130 and various data networks, e.g., other IP networks 140, an IMS core network 150, and the like. The public data network gateway is also referred to as a PDN gateway, a PDN GW or a PGW.

In one example, system 100 may include one or more additional networks 170 having one or more servers 175 (e.g., database servers). In one example, networks 170 may represent one or more destination data storage systems, e.g., a mass-storage platform, which may be informally referred to as a "big data lake." In accordance with the present disclosure, the non-flight performance related sensor data from various sensors and from various aircrafts may be stored in the destination data storage system. In one example, the destination data storage system may also be a cloud-based or network-based distributed file system. For security purposes, the destination data storage system for non-flight performance related aircraft sensor data may be isolated from other network-based mass storage platforms. Other data may also be fed into the destination data storage system from external approved sources, such as: flight schedule data, weather data, routing data, and so forth. In one example, the destination data storage system may provide redundant copies of data in various component devices of the destination data storage system. Servers 175 may represent storage devices comprising computer-readable media for storing non-flight performance related sensor data, e.g., volatile or non-volatile memory such as random access memory (RAM), a magnetic-based hard drive, a solid-state drive, and so forth. Servers 175 may also represent aircraft monitoring servers comprising logic, instructions and other data for providing operations for processing non-flight performance related sensor data from one or more aircraft sensors, in accordance with the present disclosure. For example, a first of the servers 175 may comprise an aircraft management server for a first airline, while a second of the servers 175 may comprise an aircraft management server for a second airline, a third of the servers 175 may comprise an aircraft management server for the Federal Air Marshal Service (FAMS), and so forth. In one example, one or more of the servers 175 may comprise a dedicated computing system, such as computing system 300 depicted in FIG. 3, specifically configured to provide one or more functions for processing non-flight performance related sensor data from a sensor of an aircraft, in accordance with the present disclosure.

In one example, components of EPC network 130 may be configured to receive and forward non-flight performance related sensor data collected from aircraft 160 to one or more of the networks 170. In one example, the non-flight performance related sensor data may first be forwarded to components of IMS core network 150 for onward transmission to network(s) 170. In another example, EPC network 130 may include a dedicated component, sensor data gateway 139 for collecting sensor data in EPC network 130 (including non-flight performance related sensor data from aircrafts) and forwarding the sensor data to an appropriate network and/or server of networks 170 and servers 175. For instance, in one example, air gateway 165 may transmit non-flight performance related sensor data from sensors on the aircraft 160 to eNodeBs 121 and/or 122 in eUTRAN 120.

In one example, the communication between air gateway 165 and the eNodeBs comprises an LTE machine type communication (MTC). LTE-MTC is part of 3GPP Release 13 and provides specifications for multiplexing low bandwidth and/or delay tolerant communications for devices in potentially poor coverage conditions, e.g., over long distances, in indoor or below-grade environments, and so on, with high bandwidth 4G and beyond mobile data. In one example, the non-flight performance related sensor data received from air gateway 165 may be sent to one or more of networks 170 and servers 175 via multi-protocol label switching (MPLS), virtual private network (VPN), VPN over MPLS, or other secure transport. For instance, non-flight performance related sensor data from aircraft 160, e.g., LTE-MTC communications, may be received by sensor data gateway 139 and passed to network(s) 170 and server(s) 175 via link 191, which may comprise a VPN path through network infrastructure that may be controlled by a same network operator as LTE network 110 or a different network operator. Similarly, non-flight performance related sensor data from aircraft 160 may be passed from eUTRAN 120 to EPC network 130 and from EPC network 130 to IMS core network 150 via PDN GW 138. One or more components of IMS core network 150 may then forward the non-flight performance related sensor data from aircraft 160 to network(s) 170 and server(s) 175 via link 192. Link 192 may comprise a secure transport path such as an IP/MPLS network path, a VPN path, and the like, that may be controlled by a same network operator as LTE network 110 and/or IMS core network 150, or a different network operator.

As mentioned above, in one example non-flight performance related sensor data from aircraft 160 (and from other aircraft) may be forwarded by cellular network components to one or more of servers 175 for processing. For instance, one of servers 175 may comprise an aircraft management server of an airline operating a particular aircraft and/or a particular flight. The aircraft management server may therefore receive non-flight performance related sensor data from one or more sensors aboard aircraft 160 and process the non-flight performance related sensor data. For instance, the aircraft management server may determine a condition based upon the non-flight performance related sensor data and select a recommended action based upon the condition that is determined based upon the non-flight performance related sensor data. In addition, in one example, the aircraft management server, e.g., one of the servers 175, may send the recommended action to a device of a flight crew member of the aircraft. Thus, servers 175 may send outbound communications to EPC network 130 via sensor data gateway 139, via IMS core network 150 and PDN GW 138, or via another route in system 100. MME 132 may then select an appropriate serving gateway, e.g., SGW 134, for the eNodeB(s) that may best serve air gateway 165, e.g., eNodeB 121 and/or eNodeB 122. Upon receiving a communication from one of the servers 175, air gateway 165 may then route the communication to a device or devices of one or more flight crew members. In one example, the communication may indicate a particular flight crew member, identified individually or by the flight crew member's role, to receive the communication. In another example, the communication may be sent to flight crew member devices in preselected parts of the aircraft. For example, the communication may be sent to flight crew member devices in the cockpit and in a first class galley, but not to a flight crew member device in an aft galley. In another example, the communication may be designated for delivery to any and/or all available devices for flight crew members. Thus, the closest or the first available flight crew member may then address the recommended action.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, network(s) 170 and/or server(s) 175 may alternatively be integrated within IMS core network 150. Alternatively, or in addition, other network components may be deployed in IMS core network 150 instead of being deployed within the EPC network 130, or in other portions of system 100 that are not shown, while providing essentially the same functionality. In still another example, functions of an aircraft management server may be deployed in another device deployed on aircraft 160, e.g., a device other than air gateway 165.

It should be noted that various elements of eUTRAN 120, EPC network 130, and IMS core network 150 are omitted for clarity, including gateways or border elements providing connectivity between such networks. Similarly, due to the relatively large number of connections available between devices in the system 100, various links between MME 107, SGW 108, sensor data gateway 139, eNodeBs 111 and 112, PDN gateway 110, and other components of system 100 are also omitted for clarity. In addition, although aspects of the present disclosure have been discussed above in the context of a long term evolution (LTE)-based network, examples of the present disclosure are not so limited. Thus, the teachings of the present disclosure can be applied to other types of wireless networks (e.g., a 2G network, a 3G network, and the like, or a future technology or standard-based network), for supporting communications relating to processing of non-flight performance related sensor data from a sensor of an aircraft. These and other modifications are all contemplated within the scope of the present disclosure.

Figure 2:
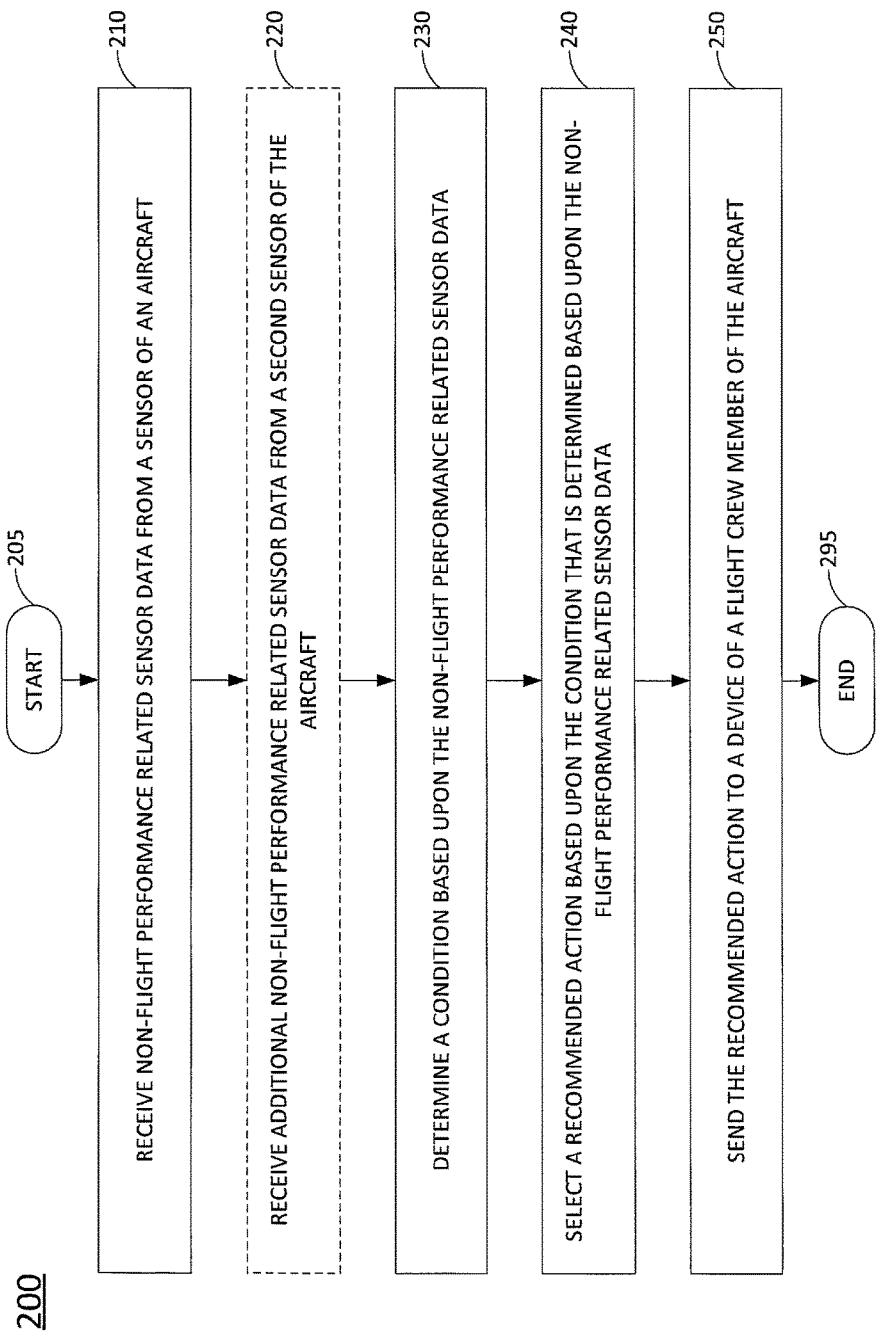
FIG. 2 illustrates an example method of the present disclosure for processing non-flight performance related sensor data from a sensor of an aircraft.

FIG. 2 illustrates a flowchart of an example method 200 of the present disclosure for processing non-flight performance related sensor data from a sensor of an aircraft. In one example, the method 200 is performed by an aircraft management server, such as air gateway 165 or one of the servers 175 in FIG. 1. Alternatively, or in addition, the steps, functions, or operations of method 200 may be performed by a device or system 300, and/or processor 302 as described in connection with FIG. 3 below, specifically programmed to perform the steps, functions and/or operations of the method. For illustrative purposes, the method 200 will now be described in terms of an embodiment where steps of the method are performed by a processor, such as processor 302 in FIG. 3.

Method 200 starts in step 205 and proceeds to step 210. In step 210, the processor receives non-flight performance related sensor data from a sensor of an aircraft. In one example, the non-flight performance related sensor data may comprise a reading of a physical parameter by the sensor and a time stamp. For instance, the sensor data may comprise seat occupancy data indicating an occupied/unoccupied state of a passenger seat, a cockpit seat, etc., a weight/force reading on a seat aboard the aircraft, a recline angle of a passenger seat, a locked/unlocked state of a lavatory door or the cockpit door aboard the aircraft, a closed/open state of a tray table, and so forth. In one example, the non-flight performance related sensor data may comprise multiple readings of a physical parameter by the sensor and respective time stamps of the readings. However, in another example, the processor may receive the non-flight performance related sensor data and add the time stamps. Thus, a time of receipt by the processor may be used as an approximation of the actual time the sensor recorded the non-flight performance related sensor data.

In one example, the processor may comprise a processor of an air gateway, broadly a "gateway device," deployed on board the aircraft, or may comprise a processor of another on-board device that may be connected to an air gateway. In one example, an air gateway may collect sensor data from various sensors aboard the aircraft via wired or wireless communications. In another example, the processor may comprise a processor of a ground-based device, e.g., a ground-based aircraft management server. For instance, the processor may receive the non-flight performance related sensor data from the sensor of the aircraft via an air gateway located aboard the aircraft in communication with a cellular network. In one example, the air gateway may communicate with the cellular network via a long term evolution machine type communication. In one example, the processor may receive the non-flight performance related sensor data of the sensor from the cellular network via a multi-protocol label switching path and/or via a virtual private network path.

At optional step 220, the processor may receive additional non-flight performance related sensor data from a second sensor of the aircraft. For instance, the non-flight performance related sensor data received at step 210 may indicate a vacant/occupied state of a passenger seat, while additional non-flight performance related sensor data received at optional step 220 may indicate a locked/unlocked state of a lavatory door. In another example, the non-flight performance related sensor data received at step 210 may indicate a vacant/occupied state of a cockpit seat, while additional non-flight performance related sensor data received at optional step 220 may indicate a locked/unlocked state of a cockpit door. The additional non-flight performance related sensor data may be received from the second sensor at optional step 220 in a same or a similar manner as the non-flight performance related sensor data is received at step 210, e.g., depending upon whether the processor is deployed in an aircraft-based aircraft management server (e.g., in an air gateway) or in a ground-based aircraft management server, whether the sensor uses wired or wireless communication to transmit sensor data to an air gateway, and so forth.

At step 230, the processor determines a condition based upon the non-flight performance related sensor data from the sensor of the aircraft. For instance, a condition detected at step 230 may comprise a condition that calls for further attention from a flight crew member. Such conditions may include a seat being unoccupied for greater than a threshold duration of time, including passenger seats, flight attendant seats, and cockpit seats. For instance, the processor may determine that a condition exists when non-flight performance related sensor data from a passenger seat indicates that the passenger seat has been unoccupied for greater than 15 minutes. In another example, a condition may comprise a passenger seat remaining at a reclined angle, e.g., any angle other than the "full, upright, and locked position," during takeoff or landing procedures, or during turbulence, or at any time a member of the flight crew has indicated that passenger seats should be upright. Similarly, a condition may comprise a tray table remaining in an open or used position during takeoff or landing procedures, or during turbulence, or at any time a member of the flight crew has indicated that tray tables should be stowed away, e.g., in the closed position. In still another example, a condition may comprise a lavatory door remaining locked for greater than a threshold duration of time, e.g., 15 minutes, or during takeoff or landing procedures, or during turbulence, or at any time a member of the flight crew has indicated that passengers should remain in their seats. In this regard, it should be noted that in some examples, the condition may be determined based upon the non-flight performance related sensor data and further based upon additional information relating to the aircraft. For instance, a pilot or a navigation system may explicitly or implicitly indicate that the aircraft is engaged in a takeoff or landing procedure, which may be related to the air gateway or other aircraft management server.

In still another example, a condition may comprise a change in detected weight/force on a seat sensor, e.g., a pressure sensor. For example, the processor may determine a condition exists when a seat sensor of a cockpit seat indicates a weight that does not correspond to a weight of a pilot assigned to the aircraft. In another example, the processor may determine that a condition exists when a seat sensor of a passenger seat indicates a weight/force reading that is different from that which was recorded at the beginning of a flight or at a certain period of time prior to a change in weight/force reading on the sensor.

In other examples, the processor may further determine a condition based upon both the non-flight performance related sensor data received at step 210 and any additional non-flight performance related sensor data that may be received at step 220. For instance, the non-flight performance related sensor data may comprise seat occupancy data pertaining to a seat of the aircraft and the additional non-flight performance related sensor data may comprise a locked/unlocked state of a lavatory door of the aircraft. In such an example, the processor may determine a condition exists when the seat has been unoccupied for greater than a threshold period of time and when the lavatory door has been locked for greater than the threshold period of time. In another example, the non-flight performance related sensor data may comprise seat occupancy data pertaining to a cockpit seat of the aircraft and the additional non-flight performance related sensor data may comprise a locked/unlocked state of a cockpit door of the aircraft. In such an example, the processor may determine a condition exists when the cockpit seat has been unoccupied for greater than a threshold period of time and when the cockpit door has been locked for greater than the threshold period of time (e.g., after having been unlocked at a prior time during a flight).

At step 240, the processor selects a recommended action based upon the condition that is determined at step 230. For instance, when the condition comprises a passenger seat being unoccupied for greater than a threshold period of time, the recommended action may comprise checking on a passenger assigned to the seat. Similarly, when the condition comprises a passenger seat being unoccupied for greater than a threshold period of time, e.g., 10 seconds, when the aircraft is engaged in a takeoff or landing procedure, the recommended action may comprise checking on a passenger assigned to the seat. In another example, when the condition comprises a lavatory door remaining locked for greater than a threshold period of time, the recommended action may comprise checking on the lavatory. Similarly, when the condition comprises a lavatory door being locked during a takeoff or landing procedure, the recommended action may comprise checking on the lavatory.

In another example, when the condition comprises a recline angle of a passenger seat being anything other than in an upright position when the aircraft is engaged in a takeoff or landing procedure, the recommended action may comprise checking on the passenger seat and/or the passenger occupying the seat. In still another example, when the condition comprises a tray table remaining open during a takeoff or landing procedure, the recommended action may comprise checking on the tray table or using the announcement system to remind the passenger for the identified seat number to lift and lock the tray table. In still another example, when the condition comprises a seat belt remaining dis-engaged during a takeoff or landing procedure, the recommended action may comprise checking on the "occupied" seat where the seat belt is detected as being dis-engaged or using the announcement system to remind the passenger for the identified seat number to engage the seat belt. In a further example, the processor may select a recommended action of checking on a pilot and/or checking on the flight deck/cockpit when a cockpit seat has been unoccupied for greater than a threshold duration of time. Similarly, when a condition comprises a weight reading of a cockpit seat sensor not corresponding to a weight of a pilot assigned to the aircraft, the recommended action may comprise checking on the pilot and/or checking on the flight deck/cockpit.

As mentioned above, in some cases a condition may be determined based upon non-flight performance related sensor data from a first sensor of an aircraft and based upon additional non-flight performance related sensor data from a second sensor of the aircraft. As such, the recommended action that is selected at step 240 may be based upon the existence of a condition that is determined from the non-flight performance related sensor data from multiple sensors. For example, when a condition determined at step 230 comprises a passenger seat being unoccupied for greater than a threshold period of time and a lavatory door being locked for greater than the threshold period of time, the recommended action may comprise checking on the passenger assigned to the seat and/or checking on the lavatory. The processor may further retrieve various information regarding the passenger in connection with the recommended action, e.g., a photograph, a home address, age, connecting flight information, additional travelling party information, and so forth. In another example, where the condition may comprise a cockpit seat remaining unoccupied for greater than a threshold period of time and when the cockpit door has been locked for greater than the threshold period of time (e.g., after having been unlocked at some time during a flight), the recommended action may comprise contacting ground-based personnel to confirm or deny the existence of a pilot emergency.

At step 250, the processor sends the recommended action to a device of a flight crew member of the aircraft. For instance, if the processor comprises a processor of an air gateway or other aircraft-based device, the recommended action may be sent as a notification via wired or wireless communication to one or more devices of the flight crew. Devices of flight crew members may include computing devices, such as interactive display panels or computing consoles, distributed throughout the aircraft, or may comprise personal mobile devices carried by the respective flight crew members, for example. In another example, if the processor comprises a processor of a ground-based device, the sending of the recommended action may comprise forwarding the recommended action to a cellular network for locating an appropriate base station, NodeB, eNodeB, or the like, for transmission of the recommended action/notification to an air gateway of the aircraft. The air gateway may then deliver the recommended action to any one or more flight crew member devices designated to receive the recommended action.

In one example, the recommended action may be addressed to one or more individual flight crew member devices. In another example, the recommended action may be sent to one or more flight crew member devices based upon the roles of the flight crew members. For instance, a recommended action to check on a passenger who has been out of the passenger's seat for greater than a threshold duration of time may only be sent to devices of flight crew members in the cockpit or in a first-class galley area, e.g., where the passenger is in a different cabin class. For instance, it may be desirable to not have this recommended action appear on a flight crew device display in a galley area that is visible to many passengers. Following step 250, the method 200 proceeds to step 295 where the method ends.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

As such, the present disclosure provides at least one advancement in the technical field of airborne sensor data collection and communication with ground-based devices. In particular, in one example, the present disclosure provides an aircraft monitoring server for processing non-flight performance related sensor data from sensors aboard an aircraft and providing recommended actions to flight crew members of the aircraft. For example, aircraft personnel have many duties and often are not able to monitor all aspects of such duties at the same time. For instance, during takeoff and landing procedures, the flight crew may instruct passengers to return seats to full upright positions and to place tray tables in a closed and locked position. The flight crew may also pass through the passenger cabin to check that each passenger and passenger seat position is in compliance. However, some passengers may simply recline their seats after the flight crew has passed. Thus, examples of the present disclosure may provide recommended actions regarding various conditions that may be detected via sensor readings of sensors throughout an aircraft. Advantageously, recommended actions based upon such non-flight performance related sensor data may be used to enhance aircraft management by flight crews and ground-based personnel, to enhance flight safety, and for other purposes that do not relate to flight performance, such as for passenger comfort, for compliance with regulations, for detection of potential malicious activity, for detection of pilot or passenger emergencies, and so forth.

The present disclosure also provides a transformation of data. For example, non-flight performance related sensor data is collected from diverse sensors and translated into recommended actions based upon conditions that are determined from the non-flight performance related sensor data.

Finally, embodiments of the present disclosure improve the functioning of a computing device, e.g., a server. Namely, a new type of server for processing non-flight performance related sensor data is provided, e.g., an aircraft management server for receiving non-flight performance related sensor data from a sensor of an aircraft, determining a condition based upon the non-flight performance related sensor data, selecting a recommended action based upon the condition that is determined based upon the non-flight performance related sensor data, and sending the recommended action to a device of a flight crew member of the aircraft. Notably, no previous server has performed these functions as described herein. For example, previous devices or servers simply send aircraft flight performance parameters such as airspeed, altitude, coordinates/position, vertical acceleration, aileron position, and so forth, in a point-to-point system, e.g., using satellite relays or via Aircraft Communications Addressing and Reporting System (ACARS) to communicate with dedicated ground-based radios.

Figure 3:
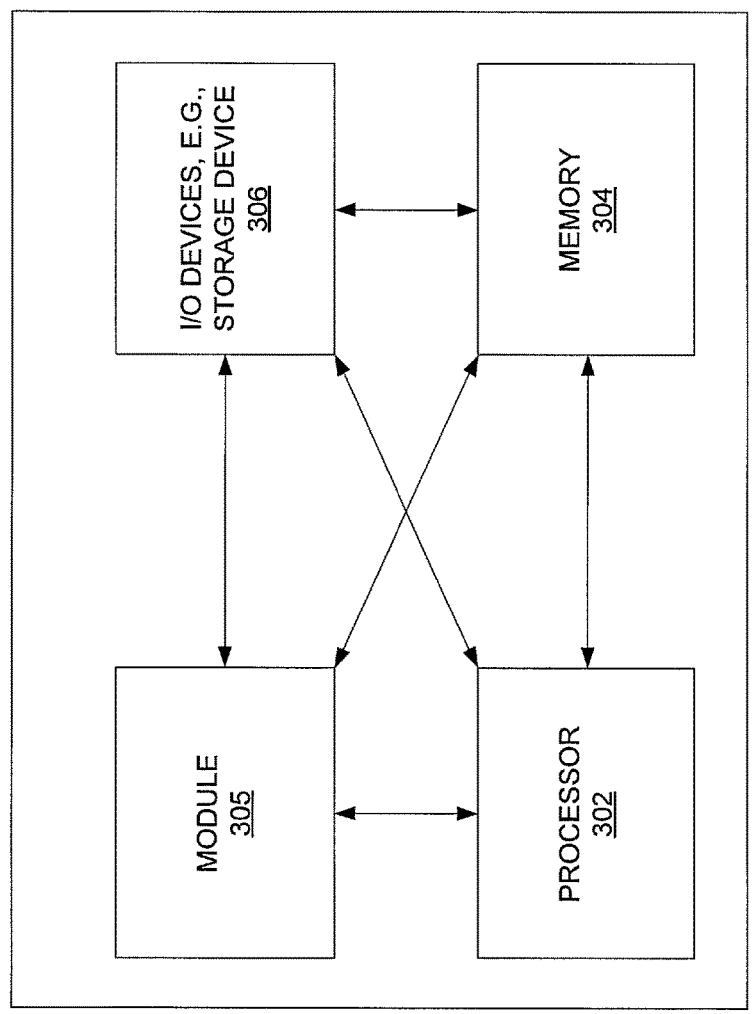
FIG. 3 illustrates an example high-level block diagram of a computing device specially configured to perform the functions, methods, operations and algorithms described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for processing non-flight performance related sensor data from a sensor of an aircraft, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 302 can also be configured or programmed to cause other devices to perform one or more operations as discussed above. In other words, the one or more hardware processors 302 may serve the function of a controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 305 for processing non-flight performance related sensor data from a sensor of an aircraft (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer-readable or software instructions relating to the above described methods can be perceived as a programmed processor or a specialized processor. As such, the present module 305 for processing non-flight performance related sensor data from a sensor of an aircraft (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described examples, but should be defined only in accordance with the following claims and their equivalents.

What is claimed is:

1. An aircraft management device comprising:
    a processor; and
    a non-transitory computer-readable medium storing instructions which, when executed by the processor, cause the processor to perform operations, the operations comprising:
        receiving non-flight performance related sensor data from a first sensor of an aircraft;
        receiving additional non-flight performance related sensor data from a second sensor of the aircraft;
        determining a condition based upon the non-flight performance related sensor data, wherein the non-flight performance related sensor data comprises seat occupancy data pertaining to a seat of the aircraft, wherein the condition is determined to exist when the seat occupancy data indicates that the seat has been unoccupied for greater than a threshold period of time;
        determining an additional condition based upon the additional non-flight performance related sensor data;
        selecting a single recommended action based upon both the condition that is determined based upon the non-flight performance related sensor data and the additional condition that is determined based upon the additional non-flight performance related sensor data; and
        sending the single recommended action to a device of a flight crew member of the aircraft, wherein the single recommended action comprises an instruction to the flight crew member to check on an individual assigned to the seat.

2. The aircraft management device of claim 1, wherein the additional non-flight performance related sensor data comprises a reading of a physical parameter by the second sensor and a time stamp.

3. The aircraft management device of claim 1, wherein the additional condition is determined to exist when the aircraft is engaged in a takeoff procedure or a landing procedure.

4. The aircraft management device of claim 1, wherein the additional non-flight performance related sensor data comprises a locked/unlocked state of a lavatory door of a lavatory of the aircraft, wherein the additional condition is determined to exist when the additional non-flight performance related sensor data indicates that the lavatory door has been locked for greater than a threshold period of time, wherein the single recommended action further comprises an instruction to the flight crew member to check on the lavatory.

5. The aircraft management device of claim 1, wherein the additional non-flight performance related sensor data comprises a locked/unlocked state of a lavatory door of a lavatory of the aircraft and an indicator of whether the aircraft is engaged in a takeoff procedure or a landing procedure, wherein the additional condition is determined to exist when the additional non-flight performance related sensor data indicates that the lavatory door has been locked and the aircraft is engaged in the takeoff procedure or the landing procedure, wherein the single recommended action further comprises an instruction to the flight crew member to check on the lavatory.

6. The aircraft management device of claim 1, wherein the additional non-flight performance related sensor data comprises seat recline angle data pertaining to the seat of the aircraft and an indicator of whether the aircraft is engaged in a takeoff procedure or a landing procedure, wherein the additional condition is determined to exist when the additional non-flight performance related sensor data indicates that a seat recline angle is not in an upright position and the aircraft is engaged in the takeoff procedure or the landing procedure, wherein the single recommended action further comprises an instruction to the flight crew member to check on the seat.

7. The aircraft management device of claim 1, wherein the additional non-flight performance related sensor data comprises an open/closed state of a tray table and an indicator of whether the aircraft is engaged in a takeoff procedure or a landing procedure, wherein the additional condition is determined to exist when the additional non-flight performance related sensor data indicates that the tray table is in an open state and the aircraft is engaged in the takeoff procedure or the landing procedure, wherein the single recommended action further comprises an instruction to the flight crew member to check on the tray table.

8. The aircraft management device of claim 1, wherein the seat occupancy data pertains to a cockpit seat of the aircraft, wherein the condition is determined to exist when the seat occupancy data indicates that the cockpit seat has been unoccupied for greater than a threshold period of time, wherein the single recommended action comprises an instruction to the flight crew member to check on a pilot associated with the cockpit seat.

9. The aircraft management device of claim 1, wherein the seat occupancy data comprises a weight reading on a cockpit seat of the aircraft, wherein the condition is determined to exist when the seat occupancy data indicates that the weight reading does not correspond to a weight of a pilot assigned to the aircraft, wherein the single recommended action further comprises an instruction to the flight crew member to check on the pilot.

10. The aircraft management device of claim 1, wherein the additional non-flight performance related sensor data comprises a locked/unlocked state of a lavatory door of a lavatory of the aircraft, wherein the additional condition is determined to exist when the additional non-flight performance related sensor data indicates that the lavatory door has been locked for greater than the threshold period of time, wherein the single recommended action further comprises an identification of the individual assigned to the seat and an instruction to the flight crew member to check on the lavatory.

11. The aircraft management device of claim 1, wherein the seat occupancy data pertains to a cockpit seat of the aircraft, wherein the additional non-flight performance related sensor data comprises a locked/unlocked state of a cockpit door of the aircraft, wherein the condition is determined to exist when the seat occupancy data indicates that the cockpit seat has been unoccupied for greater than a threshold period of time and the additional condition is determined to exist when the additional non-flight performance related sensor data indicates that the cockpit door has been locked for greater than the threshold period of time, wherein the single recommended action further comprises an instruction to the flight crew member to contact ground-based personnel to confirm an emergency.

12. The aircraft management device of claim 1, wherein the aircraft management device is a ground-based device, wherein the non-flight performance related sensor data is received from the first sensor of the aircraft via a gateway device located on the aircraft in communication with a wireless network.

13. The aircraft management device of claim 12, wherein the gateway device communicates with the wireless network via a long term evolution machine type communication.

14. The aircraft management device of claim 12, wherein the non-flight performance related sensor data is received from the wireless network via a multi-protocol label switching path.

15. The aircraft management device of claim 12, wherein the non-flight performance related sensor data is received from the wireless network via a virtual private network path.

16. The aircraft management device of claim 1, wherein the aircraft management device is deployed in the aircraft.

17. A non-transitory computer-readable medium storing instructions which, when executed by a processor, cause the processor to perform operations, the operations comprising:
receiving non-flight performance related sensor data from a first sensor of an aircraft;
receiving additional non-flight performance related sensor data from a second sensor of the aircraft;
determining a condition based upon the non-flight performance related sensor data, wherein the non-flight performance related sensor data comprises seat occupancy data pertaining to a seat of the aircraft, wherein the condition is determined to exist when the seat occupancy data indicates that the seat has been unoccupied for greater than a threshold period of time;
determining an additional condition based upon the additional non-flight performance related sensor data;
selecting a single recommended action based upon both the condition that is determined based upon the non-flight performance related sensor data and the additional condition that is determined based upon the additional non-flight performance related sensor data; and
sending the single recommended action to a device of a flight crew member of the aircraft, wherein the single recommended action comprises an instruction to the flight crew member to check on an individual assigned to the seat.

18. A method, comprising:
receiving, by a processor, non-flight performance related sensor data from a sensor of an aircraft;
receiving, by the processor, additional non-flight performance related sensor data from a second sensor of the aircraft;
determining, by the processor, a condition based upon the non-flight performance related sensor data, wherein the non-flight performance related sensor data comprises seat occupancy data pertaining to a seat of the aircraft, wherein the condition is determined to exist when the seat occupancy data indicates that the seat has been unoccupied for greater than a threshold period of time;
determining, by the processor, an additional condition based upon the additional non-flight performance related sensor data;
selecting, by the processor, a single recommended action based upon both the condition that is determined based upon the non-flight performance related sensor data and the additional condition that is determined based upon the additional non-flight performance related sensor data; and
sending, by the processor, the single recommended action to a device of a flight crew member of the aircraft, wherein the single recommended action comprises an instruction to the flight crew member to check on an individual assigned to the seat.

19. The method of claim 18, wherein the additional non-flight performance related sensor data comprises a locked/unlocked state of a lavatory door of a lavatory of the aircraft, wherein the additional condition is determined to exist when the additional non-flight performance related sensor data indicates that the lavatory door has been locked for greater than the threshold period of time, wherein the single recommended action further comprises an identification of the individual assigned to the seat and an instruction to the device of the flight crew member to check on the lavatory.

20. The method of claim 18, wherein the additional non-flight performance related sensor data comprises a locked/unlocked state of a lavatory door of a lavatory of the aircraft, wherein the additional condition is determined to exist when the additional non-flight performance related sensor data indicates that the lavatory door has been locked for greater than a threshold period of time, wherein the single recommended action further comprises an instruction to the flight crew member to check on the lavatory.

* * * * *